(12) United States Patent
Kobayashi

(10) Patent No.: US 7,596,262 B2
(45) Date of Patent: Sep. 29, 2009

(54) IMAGE FORMING APPARATUS, IMAGE PROCESSING METHOD, PROGRAM, AND IMAGE PROCESSING APPARATUS

(75) Inventor: Makoto Kobayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 788 days.

(21) Appl. No.: 10/900,078

(22) Filed: Jul. 26, 2004

(65) Prior Publication Data

US 2005/0046882 A1 Mar. 3, 2005

(30) Foreign Application Priority Data

Jul. 31, 2003 (JP) .............................. 2003-204364

(51) Int. Cl.
*G06K 9/00* (2006.01)
(52) U.S. Cl. ...................... 382/162; 358/518
(58) Field of Classification Search ......... 382/162–167; 358/1.9, 3.24, 3.26, 518, 500, 501, 510
See application file for complete search history.

(56) References Cited

U.S. PATENT DOCUMENTS 5,438,648 A * 8/1995 Takaoka et al. .............. 358/1.6

2004/0061760 A1 * 4/2004 Yano et al. .................. 347/102

FOREIGN PATENT DOCUMENTS

JP 2608262 2/1997

* cited by examiner

*Primary Examiner*—Duy M Dang
(74) *Attorney, Agent, or Firm*—Hogan & Hartson LLP

(57) ABSTRACT c, m, and y, which are the primary colors, are calculated from inputted RGB data. Duty limitation is then applied to c, m, and y by means of the limit amount α. c', m', and y', which have been limited by α, are then normalized. The largest limit amount is β when the normalized values are less than 200%. If these values are between 200% and 250%, β+((c"+m"+y")/255−2)×2γ is then the largest limit amount, which is β+γ when the values are equal to or more than 250%. C, M, Y, and K are obtained by subjecting c', m', and y' to under color removal and black generation processing. Unless the total of these values exceeds the largest limit amount, C, M, Y, K are outputted as is as the output values C', M', Y', and K'. When the largest limit amount is exceeded, Duty limitation is applied.

10 Claims, 8 Drawing Sheets

IMAGE FORMING APPARATUS, IMAGE PROCESSING METHOD, PROGRAM, AND IMAGE PROCESSING APPARATUS

BACKGROUND OF THE INVENTION

1. Field of the Invention

The present invention relates to an image forming apparatus and method thereof, and, more particularly, to an image forming apparatus that limits the amounts of toner of a plurality of colors, and the method thereof.

2. Description of the Related Art

When a color printer generates an image, color representation is normally performed by means of toner, ink, and so forth in four colors, which are cyan (C), magenta (M), yellow (Y), and black (K). In this case, although color representation is possible up to a Duty of 400% in which toners in all four colors (recording agent) are mixed at 100%, when data with such a high Duty are printed, the print paper winds around the fusing unit due to the large amount of toner, thereby rendering normal printing impossible. Further, a drop in image quality also results when printing is performed such that so-called blurring caused by the scattering of toner, is generated, and therefore fine lines and the like run.

Processing known as so-called undercolor removal, black generation, and so forth, to limit the amount of toner in order to prevent this phenomenon, has been performed. Such processing enables a reduction in the amount of toner in all four colors to about 230%.

In addition, there is a risk of the recording medium absorbing ink when data with this high Duty is printed. Therefore, conventionally, processing to reduce the sum of total of the amounts of recording agent in a single uniform fashion without changing the proportion of each cyan, magenta, and yellow component is also carried out (Japanese patent application No. 2608262, for example)

However, the generation of blurring due to the type of printer cannot be prevented by means of undercolor removal and black generation alone, and a drop in image quality cannot be prevented unless the Duty of the whole amount of toner in four colors is reduced to about 150%, for example.

Meanwhile, when the Duty is limited (to about 150%, for example) in a single uniform fashion, because brightness inversion is generated in dark areas and the color reproduction range is then small, deterioration in the picture quality results.

SUMMARY OF THE INVENTION

Accordingly, an object of the present invention is to provide an image forming apparatus that limits the toner amount so that blurring is not generated and improves color reproducibility even in dark areas, and to a method thereof.

In order to resolve the above object, the present invention is an image forming apparatus, comprising: color processing unit that determines amounts of recording agent so that, when total of primary color grayscale values generated from input image data is equal to or less than a first threshold value, total of the amounts of recording agent of a plurality of colors is equal to or less than a first total limit, and determine the amounts of recording agent so that, when the total of the primary color grayscale values is equal to or more than a second threshold value larger than the first threshold value, the total of the amounts of the recording agent is equal to or less than a second total limit larger than the first total limit; and recording unit which records an image for the input image data on a recording medium on the basis of the amounts of recording agent of the plurality of colors determined by the color processing unit. Accordingly, the generation of blurring in the input image is suppressed and color reproducibility can be improved in dark areas without the phenomenon of brightness inversion occurring, for example, whereby a high-quality image output can be obtained.

In addition, the present invention is the above image forming apparatus, wherein the color processing unit determines the amounts of recording agent so that, when the total of the primary color grayscale values is between the first and second threshold values, the total of the amounts of the recording agent is equal to or less than a third total limit between the first and second total limits. Accordingly, the limit amount for the amount of recording agent gradually changes from the first threshold value to the second threshold value, and hence the continuity of the color representation can be secured.

Furthermore, the present invention is the above image forming apparatus, wherein the total of primary color grayscale values is determined by total of the values rendered by normalizing the primary color grayscale values. Accordingly, it is possible to easily discriminate from the normalized values whether the sum of total of the grayscale values is equal to or less than the first threshold value or equal to or more than the first threshold value, for example.

Furthermore, the present invention is the above image forming apparatus, wherein, when the total of the amounts of recording agent exceeds the first total limit or the second total limit, the color processing unit reduces the total of the amounts of rendering agent within the first total limit or the second total limit so that the proportions of the amounts of recording agent of each color do not change. Accordingly, for example, it is possible to keep the sum of total of the amounts of recording agent within this limit amount even when the amount of recording agent exceeds the first limit amount or second limit amount, and the generation of blurring in the input image can be suppressed, whereby a high-quality image output can be obtained even in dark areas.

Furthermore, the present invention is the above image forming apparatus, wherein the color processing unit further comprise: undercolor removal unit which determines the amounts of recording agent of the plurality of colors by performing undercolor removal and black generation processing on the generated primary colors. Accordingly, the generation of blurring can be suppressed by reducing the amount of recording agent used, for example.

Furthermore, the present invention is the above image forming apparatus, wherein the primary colors are cyan, magenta, and yellow, and the plurality of colors has black added thereto. Accordingly, a print output can be obtained easily for input image data, for example.

Furthermore, in order to resolve the above objects, the present invention is an image processing method, wherein: amounts of recording agent are determined so that, when total of primary color grayscale values generated from input image data is equal to or less than a first threshold value, total of the amounts of recording agent of a plurality of colors is equal to or less than a first total limit, and the amounts of recording agent are determined so that, when the total of the primary color grayscale values is equal to or more than a second threshold value lager than the first threshold value, the total of the amounts of the recording agent is equal to or less than a second total limit larger than the first total limit. Accordingly, for example, the generation of blurring is suppressed for the input image and color reproducibility in dark areas can be improved without the phenomenon of brightness inversion occurring, whereby a high-quality image output can be obtained.

In addition, in order to resolve the above objects, the present invention is a program that allows a computer to execute processing to determine the amounts of recording agent, wherein: amounts of recording agent are determined so that, when total of primary color grayscale values generated from input image data is equal to or less than a first threshold value, total of the amounts of recording agent of a plurality of colors is equal to or less than a first total limit, and the amounts of recording agent are determined so that, when the total of the primary color grayscale values is equal to or more than a second threshold value larger than the first threshold value, the total of the amounts of the recording agent is equal to or less than a second total limit larger than the first total limit. Accordingly, for example, the generation of blurring is suppressed for the input image and color reproducibility in dark areas can be improved without the phenomenon of brightness inversion occurring, whereby a high-quality image output can be obtained.

Furthermore, in order to resolve the above object, the present invention is an image processing apparatus, comprising: color processing unit that determines amounts of recording agent so that, when total of primary color grayscale values generated from input image data is equal to or less than a first threshold value, total of the amounts of recording agent of a plurality of colors is equal to or less than a first total limit, and determine the amounts of recording agent so that, when the total of the primary color grayscale values is equal to or more than a second threshold value larger than the first threshold value, the total of the amounts of the recording agent is equal to or less than a second total limit larger than the first total limit.

DESCRIPTION OF THE PREFERRED EMBODIMENTS

Embodiments of the present invention will be described below with reference to the drawings.

Figure 1:
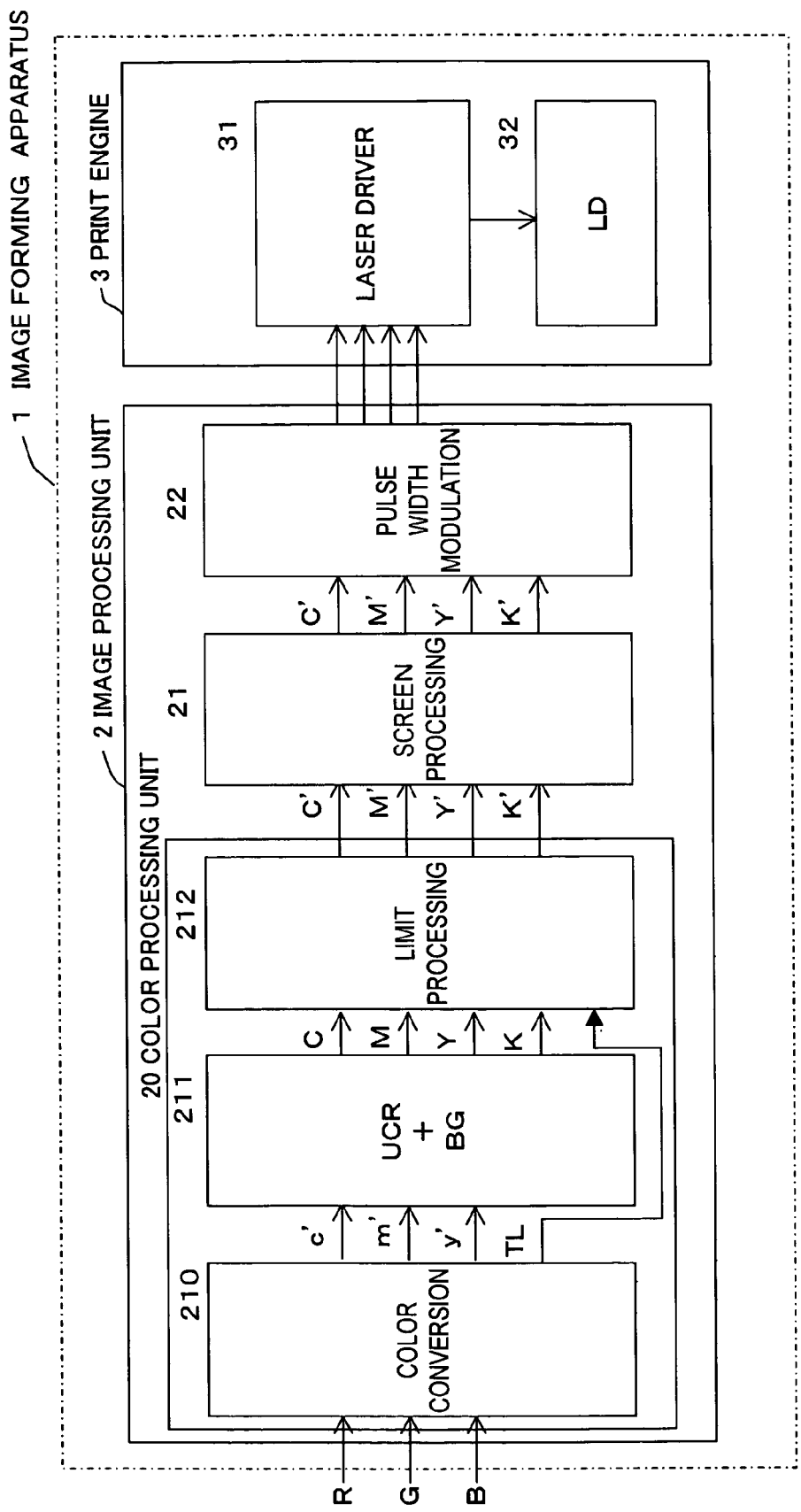
FIG. 1 shows the constitution of an image forming apparatus to which the present invention is applied.

FIG. 1 shows the constitution of an image forming apparatus 1 to which the present invention is applied. The image forming apparatus 1 is constituted overall by an image processing unit 2 and a print engine 3. The image processing unit 2 is constituted by a color processing unit 20 that performs processing such as color conversion, a screen processing unit 21, and a pulse width modulation unit 22. The print engine 3 is constituted by a laser driver 31 and a laser diode (LD) 32. In addition, the color processing unit 20 is constituted by a color conversion unit 210, a UCR+BG unit 211 for performing undercolor removal processing or similar, and a limit processing unit 212 that performs Duty limitation by means of a largest limit amount.

An outline of the operation of the image forming apparatus 1 will be described next. First, RGB data are inputted to the image forming apparatus 1. In cases where the image forming apparatus 1 and a personal computer are connected, for example, this RGB data may be generated by means of rasterization by means of a driver of the personal computer and then inputted according to a predetermined transmission format. In addition, a connection may be made to a cellular phone, digital camera, or the like, and the RGB data inputted in the same manner. This RGB data is then inputted to the color conversion unit 210 of the color processing unit 20.

The color conversion unit 210 first calculates complementary color c (cyan) m (magenta), and y(yellow) for each of the RGB data thus inputted. Each of the respective cmy values thus calculated then undergoes Duty limitation at a predetermined limit amount $\alpha$ in order to suppress the generation of blurring when printing with a single color. c', m', and y', which are the limited values of cyan, magenta, and yellow respectively, are each normalized and the largest limit amount Total Limit is computed from the total value of these respective limited values. The total amount of toner is suppressed by means of the largest limit amount, the purpose being to improve the image quality. The details will be provided subsequently. The values of the limited c', m', and y', and the largest limit amount Total Limit (TL) are each outputted by the color conversion unit 210.

The respective values of c', m', and y', which are outputted by the color conversion unit 210, are inputted to the UCR+BG unit 211. Under Color Removal (UCR) and Black Generation (BG) processing are then performed on the basis of the respective values of c', m', and y'. Undercolor removal is processing to reduce the amount of data by reducing the overlapping gray component (or black component) in the CMY and to decrease the total amount of toner (amount of recording agent). Further, black generation is processing to generate a black component (K) by determining to what degree the black component is contained in common areas. The details of this processing will be described subsequently. Other CMY toner amounts can be reduced by generating a black component, whereby an image output of favorable quality can be obtained.

The respective values of C, M, Y, and K (black) thus generated by the UCR+BG unit 211 are inputted to the limit processing unit 212 and the largest limit amount (TL) generated by the color conversion unit 210 is inputted. The limit processing unit 212 compares the total value of each amount of CMYK toner with the largest limit amount. When the total value is less than the limit amount, the respective values of CMYK generated by the UCR+BG unit 211 are outputted as is, and when the limit amount is exceeded, Duty limitation is performed so that these values are equal to or less than the limit amount. Moreover, the limit amount is not always fixed, and the largest limit amount may be made variable in accordance with the total of the normalized toner amounts. The details will be provided subsequently. Therefore, by carrying out Duty limitation on the CMYK, which have undergone processing such as undercolor removal, in accordance with the total value of the normalized toner amounts, a print output can be obtained in which the generation of blurring is suppressed and reproducibility in the dark areas is improved. Respective data for cyan (C'), magenta (M'), yellow (M'), and black (K'), which are equal to or less than largest limit amounts, are outputted by the limit processing unit 212 of the color processing unit 20.

The screen processing unit 21 has the respective C', M', Y', and K' data outputted by the color processing unit 20 inputted thereto and converts C'M'Y'K', which are data with multiple grayscale values, into pulse-width data. For example, respective C'M'Y'K' grayscale values and threshold values in a matrix are compared by using a threshold value matrix constituted by a predetermined number of pixels, before being converted into pulse-width data (0,255) with two values, which are data representing dot generation and data that do not generate dots. A procedure also exists in which, by using an index table and a γ table in addition to this dither processing, pulse-width data corresponding with input values in respective index positions is converted by means of a γ table. Alternatively, error diffusion processing, which performs similar processing by comparing predetermined threshold values with respective grayscale values, determining data representing dot generation and data not indicating dot generation, and then diffusing the errors to adjacent pixels, is also possible.

The pulse width modulation unit 22 generates drive data with or without a drive pulse for each dot for pulse width data that is outputted by the screen processing unit 21. The drive data is outputted to the laser driver 31.

The laser driver 31 generates control data indicating the presence or absence of a drive pulse from the inputted drive data and outputs the control data to the laser diode (LD) 32. The laser diode 32 is driven on the basis of control data outputted by the laser driver 31 and a photosensitive drum, transfer belt, and so forth (not shown) are also driven, whereby the RGB data inputted to the image forming apparatus 1 is actually printed on a recording medium such as print paper.

Figure 2:
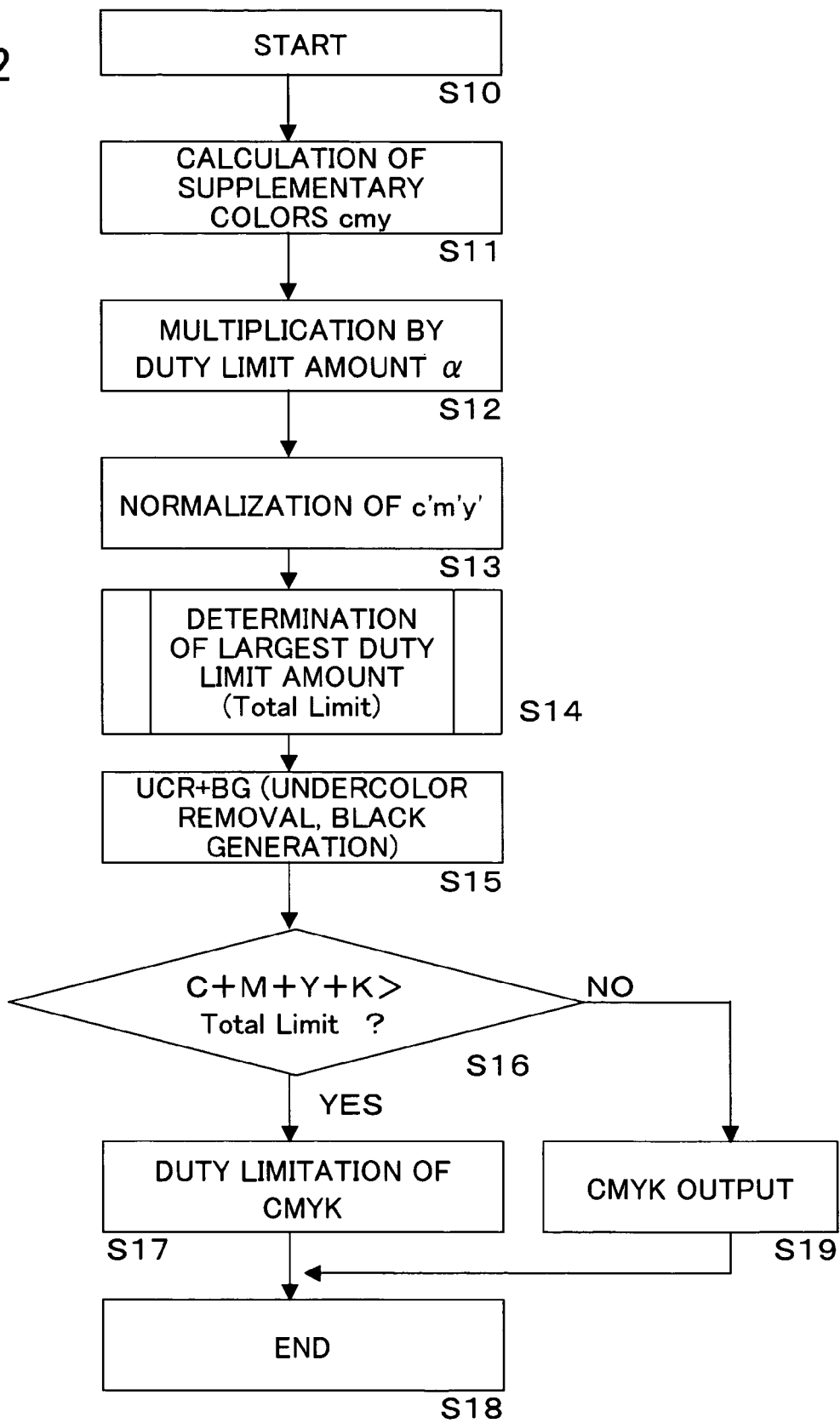
FIG. 2 is a flowchart showing the operation of the color processing unit.

Next, the details of the processing performed by the color processing unit 20 mentioned above will be described specifically with reference to FIG. 2 and subsequent drawings. FIG. 2 shows the processing operation by the color processing unit 20 by means of a flowchart. More specifically, the processing operation, which extends from the inputted RGB data to the point where the CMYK are outputted with a Duty limit applied so that the values are all equal to or less than the limit amount, is shown. The operation itself is performed by the control of the CPU of the image processing unit 2. Further, it is assumed that, in FIG. 1, processing is performed by the color conversion unit 210 from steps S11 to S14, processing is performed by the UCR+BG unit 211 in step S15, and processing is performed by the limit processing unit 212 from steps S16 to step S19.

Figure 4A:
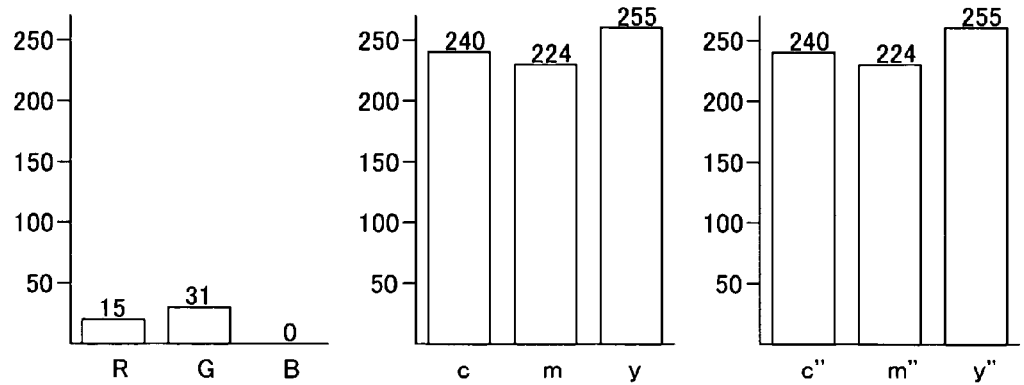
FIGS. 4A, 4B, and 4C shows specific examples of normalized toner amounts.
Figure 4B:
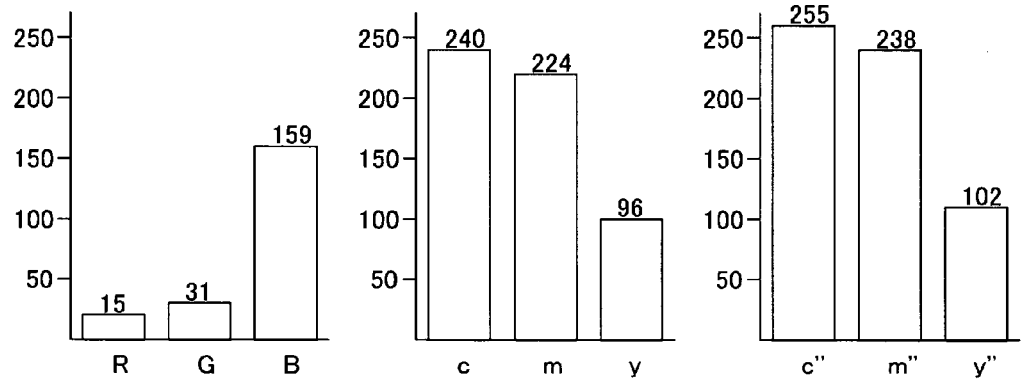
Figure 4C:
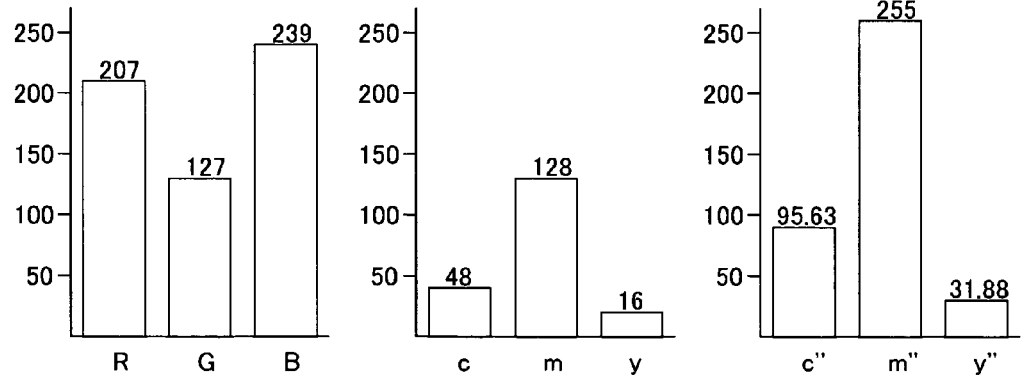

First, when the processing is started (step S10), the respective values of the complementary colors cmy are calculated (step S11). The method of calculation is performed by the following arithmetic expression:

$$c = 255 - R$$

$$m = 255 - G$$

$$y = 255 - B,$$

where RGB are the input data and RGB each have grayscale values from 0 to 255 (8 bits). An example is shown in FIG. 4A. When the input RGB data are the grayscale values 15, 31, and 0 respectively, the complementary colors cmy are then 240, 224, and 255 respectively (See center of FIG. 4A). The respective values of c, m, and y are also calculated by means of the above expression in the same manner in FIGS. 4B and 4C. The respective values are shown in the center of FIGS. 4B and 4C.

Returning now to FIG. 2, the complementary colors cmy are then multiplied by the Duty limit amount a (step S12). Supposing that the calculated cmy values are c'm'y' respectively, this gives:

$$c' = (\alpha/100) \times c$$

$$m' = (\alpha/100) \times m$$

$$y' = (\alpha/100) \times y.$$

Here, the imposition of a Duty limit by means of α (0<α≦100) on CMYK, which are the primary colors, serves to suppress the generation of blur by the print engine when printing is with a single color. For example, the setting of a at a predetermined value when blur is produced by printing with a single color before shipping the apparatus from the factory may be considered. However, α is normally calculated at 100 (%) and no limit is imposed. Calculation will also be at 100(%) hereinbelow.

Next, normalization processing is performed on each of the calculated c', m' and y' data (step S13) in order to facilitate calculations in subsequent processing. More specifically, the color with the largest grayscale value among the colors is taken as 100% in order to be able to also judge whether the total of the grayscale values of other colors exceeds 100%. Supposing that normalized c', m', and y' are c", m", and y" respectively, normalization processing employs the following arithmetic expression.

$$\begin{aligned} c'' &= \{c'/\max(c', m', y')\} \times 255 \\ &= (255 \times \alpha)/(100 \times \max(c', m', y')) \times c \\ m'' &= \{m'/\max(c', m', y')\} \times 255 \\ &= (255 \times \alpha)/(100 \times \max(c', m', y')) \times m \\ y'' &= \{y'/\max(c', m', y')\} \times 255 \\ &= (255 \times \alpha)/(100 \times \max(c', m', y')) \times y. \end{aligned}$$

An example of the results of calculating c", m", and y" when α is assumed to be 100(%) is shown on the right-hand side of FIG. 4A. In this case, max (c', m', y') is then 255, which is the grayscale value of y' (the same value as y because α is at 100%), and when the above expression undergoes substitution, C", m", and y" then become 240, 224, and 255 respectively. Similarly, the results of calculating c", m", and y" when α=100(%) are shown on the right-hand side of FIGS. 4B and 4C. More particularly, when "255" is allocated to the color with the largest grayscale value among c, m, and y by means of normalization as shown in FIGS. 4B and 4C, the size of the grayscale values of other colors in relation to "255" can be confirmed.

Figure 3:
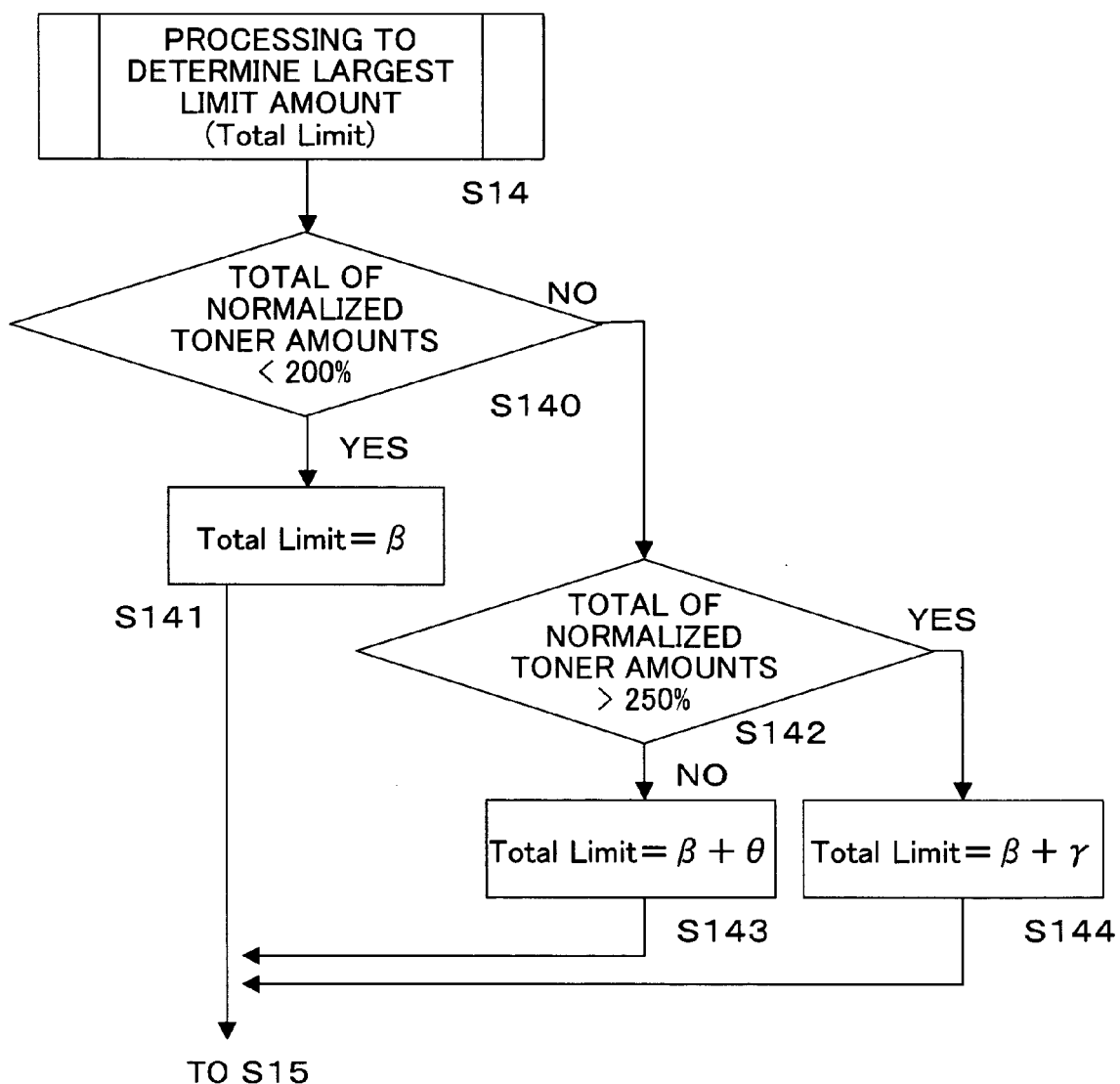
FIG. 3 is a flowchart showing processing to determine the largest limit amount.

Returning now to FIG. 2, processing to determine the Total Limit, which is the largest Duty limit amount, is then performed (step S14). This processing serves to determine whether to execute Duty limitation by comparing the largest limit amount and the total amount of CMYK toner that is actually used in subsequent processing. The flowchart of the determination processing is shown in FIG. 3. First, when the transition to this process is made, it is judged whether the total of the normalized toner amounts exceeds 200% (step S140). That is, when a value obtained by calculating the total of the values of c", m", and y" calculated in step S13 and then dividing by 255, which is the largest toner amount value, is multiplied by 100, it is judged whether this value exceeds 200(%). Therefore, the total of the normalized toner amounts here is provided by the following equation:

$$((c''+m''+y'')/255) \times 100 (\%)$$

Here, the judgment of whether this value exceeds 200 (%) serves the judgment of whether the largest value of the secondary color normalized toner amounts (the value obtained by dividing the sum of the largest grayscale values of two colors by 255 and multiplying this value by 100) is 200% and whether to produce tertiary colors and quaternary colors by adding other colors if 200% is exceeded. For example, when changing a secondary color to black, black is added but the amount of toner then also increases. The largest limit amount in the color range in which this change occurs is set so that the limit amount is gradually raised in accordance with an increase in the toner amount. Thus, color reproducibility can be improved in dark areas in comparison with a case where limitation is always implemented by means of a fixed amount.

Returning now to FIG. 3, when the total of the normalized toner amounts does not exceed 200% (YES in step S140), the value of the Total Limit, which is the largest limit amount, is then set as $\beta$ (step S141). When, on the other hand, 200% is exceeded (NO in step S140), it is judged whether the total of the normalized toner amount exceeds 250% (step S142). When 250% is not exceeded (NO in step S142), the largest limit amount (Total Limit) is $\beta+\theta$ (step S143), and when 250% is exceeded (YES in step S142), the largest limit amount is set as $\beta+\gamma$ (step S144). That is, when 200% is not exceeded, secondary colors readily used for characters and narrow lines such as red, green, and blue, are employed and the largest limit amount is set as a predetermined value (160%, for example) $\beta$ so that blur does not occur. When 200% is exceeded, the largest limit amount is gradually raised in the range of the colors appearing in the change from the secondary colors to the tertiary colors, and when 250% is exceeded, reproducibility in dark areas is improved by imposing a limit by means of a fixed value $\beta+\gamma$.

Figure 5:
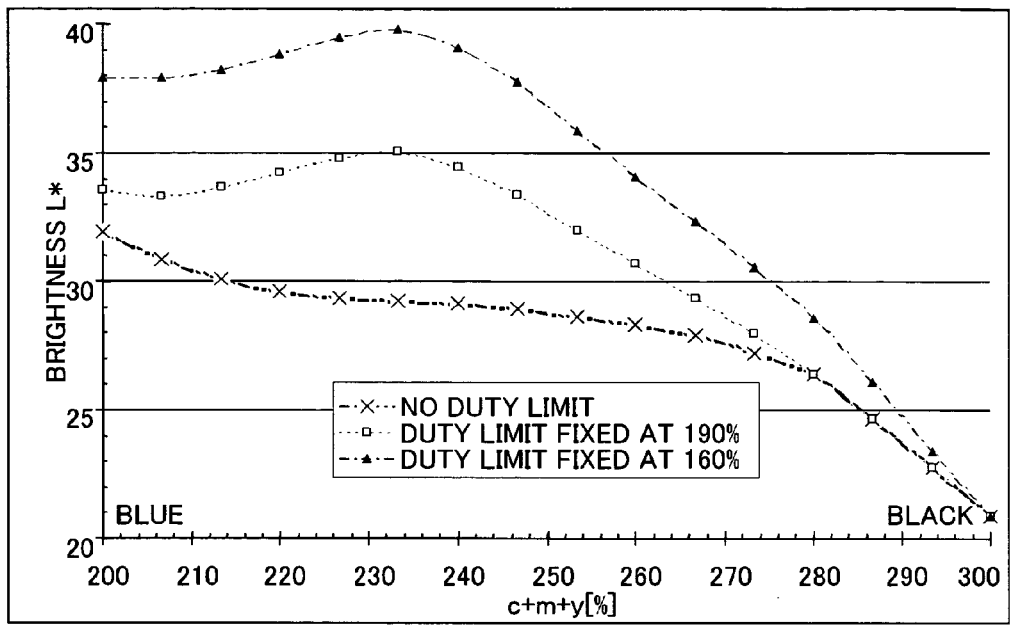
FIG. 5 shows the relationship between the normalized toner amount and brightness.

Here, the relationship between brightness and normalized toner amounts will be described with reference to FIG. 5. In FIG. 5, the horizontal axis represents the total value of the normalized toner amounts (that is, a value rendered by dividing the total value of c", m", and y" by 255 and multiplying the result by 100), and the vertical axis represents the brightness. The graph indicated by a dash-dot line plotted by means of triangle symbols represents a case where the largest limit amount is fixed at 160% (a case where Duty limitation is at 160%), the graph indicated by a dotted line plotted by means of square symbols represents a case where the largest limit amount is fixed at 190%, and the graph indicated by a dash-dot-dot line plotted by means of x symbols represents a case where there is absolutely no limitation.

As shown in FIG. 5, when the total of the normalized toner amounts exceeds 200% when the limit amount is always fixed, the brightness gradually increases so that same is greatest when the toner amount approaches 230%. It is expected that, in the change to the original black, the brightness should gradually darken. However, as shown in FIG. 5, when Duty limitation is implemented with a fixed value, brightness inversion occurs as a result of the existence of light colors in regions that are supposed to be dark. As a result, color reproducibility is inferior in the dark areas, which produces deterioration in the image quality.

Brightness inversion may be considered to occur because, when Duty limitation is always implemented with a fixed value, although the respective values of CMY are limited to the limit amount or lower when the limit amount is exceeded, CMY are limited all together. Brightness inversion may also be considered to occur because the colors of CMY, which are the three primary colors, are reproduced for the human eye as a result of the reflection of light from the light source, light from the light source being absorbed needlessly.

Figure 6:
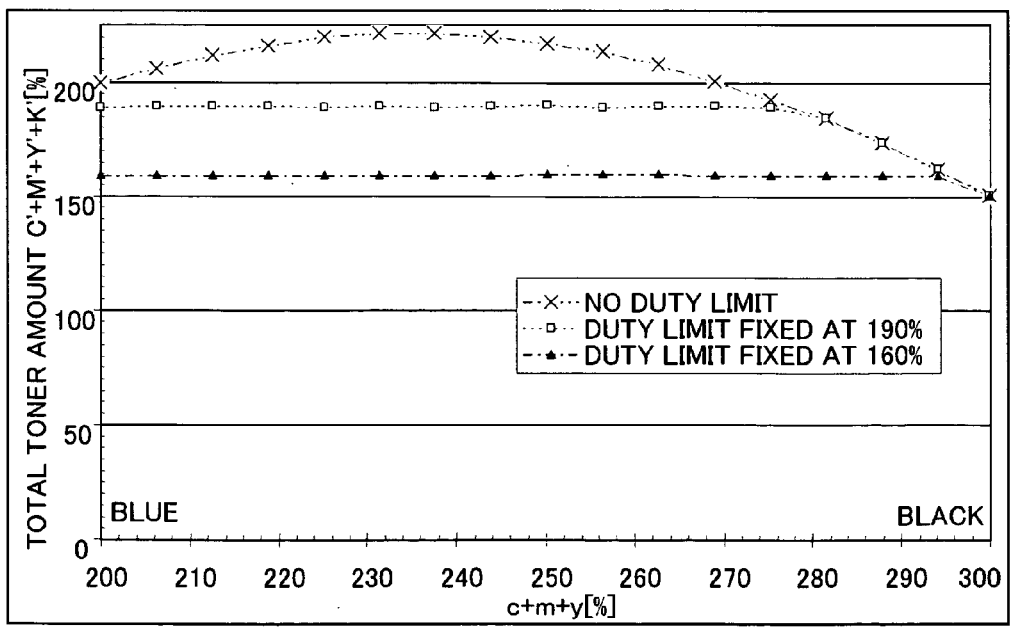
FIG. 6 shows the relationship between the normalized toner amount and the total toner amount.

On the other hand, when there is no limitation, although the brightness inversion as shown in FIG. 5 is not produced, blurring then occurs due to the increase in the amount of toner. FIG. 6 shows the relationship between the total toner amount and the normalized toner amount. The horizontal axis represents the total value of the normalized toner amounts as in FIG. 5 (likewise, a value rendered by dividing the total value of c", m", and y" by 255 and then multiplying the result by 100), and the vertical axis represents the total toner amount C'+M'+Y'+K' (this is likewise a value obtained by dividing the sum total of the total toner amounts C', M', Y', and K' by 255 and multiplying the result by 100). The graph indicated by a dash-dot line plotted by means of triangle symbols represents a case where Duty limitation is at 160%, the graph indicated by a dotted line plotted by means of square symbols represents a case where Duty limitation is at 190%, and the graph indicated by a dash-dot-dot line plotted by means of x symbols represents a case where there is no limitation at all.

As shown in FIG. 6, when Duty limitation is implemented, the toner amount changes substantially due to this limit amount. When there is no limitation, the total toner amount is greatest when the value of the normalized toner amount approaches 230%. That is, the densest color is produced when the greatest amount of toner is used at close to 230%. However, when the toner is used as is, blurring is produced as a result of using a large amount of toner. Further, irrespective of whether a lot of toner is used originally, when limitation is implemented with the Duty limitation fixed, the image is brightest as a result of brightness inversion at close to 230% as mentioned earlier (See FIG. 5).

Further, the toner amount is therefore largest at close to 230% not because black toner is completely used but instead because the color is expressed with the Duty kept at about 160%. Therefore, when the Duty for the black toner amount is limited by means of a different value, the largest toner amount is then produced by means of a value different from 230%.

Therefore, when 200% is exceeded as mentioned earlier, the generation of blurring is suppressed by raising the Duty limit amount (largest limit amount Total Limit), and color reproducibility can be improved by preventing the phenomenon of brightness inversion. More specifically, when the total value of the normalized toner amounts exceeds 200% in the processing to determine the largest limit amount (step S14 in FIG. 3), the processing moves to step S142 and it is judged whether 250% has not been exceeded. When 250% is not exceeded, the limit amount is determined so that the largest limit amount is gradually raised from $\theta$ to $\theta+\gamma$. That is, the following equation is used for $\theta$.

$$\theta = [\{\{(c'' + m'' + y'')/255\} \times 100 - 200\}/\{250 - 200\}] \times \gamma$$
$$= ((c'' + m'' + y'')/255 - 2) \times 2 \times \gamma$$

Therefore, the largest limit amount is not raised from $\beta$ to $\beta+\gamma$ in one go but is instead raised gradually from $\beta$ to $\beta+\gamma$ by using $\theta$ in order to secure a continuous color representation over this interval.

Figure 7:
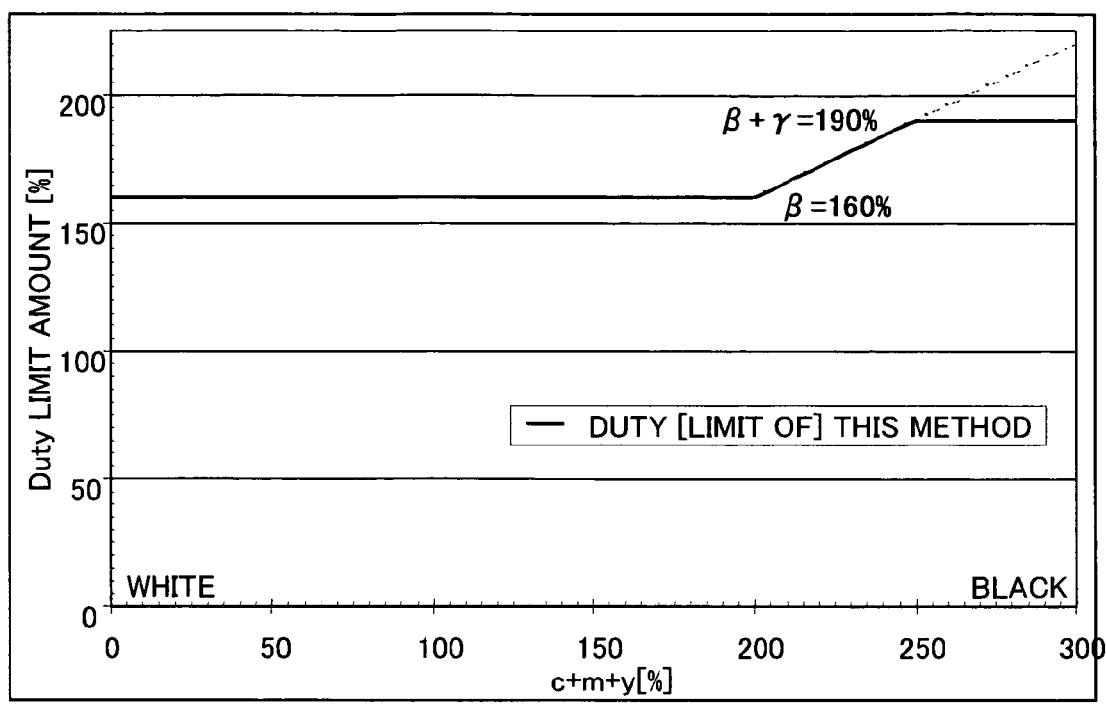
FIG. 7 shows the relationship between the normalized toner amount and the Duty limit amount.

Further, suppose that, when the total of the normalized toner amounts exceeds 250%, the largest limit amount is then to β+γ. γ is a fixed value. A case where Duty limitation is performed in this manner is shown in FIG. 7. The horizontal axis represents the total value of the normalized toner amounts (this is, as per FIG. 5, a value rendered by dividing the sum total of c", m", and y" by 255 and then multiplying this value by 100), while the vertical axis represents the Duty limit amount. In FIG. 7, although the Duty limit amount represents the total toner amount as per FIG. 6, the Duty limit amount is displayed in order to facilitate the description.

The normalized toner amounts change such that the largest limit amount (Total Limit) is a fixed value β up to 200%, β+θ(=β+((c"+m"+y")/255−2)×2×γ) from 200% to 250%, and a fixed value β+γ when 250% is exceeded. Here, θ represents an oblique line when the normalized toner amount moves from 200% to 250% in FIG. 7. Thus, by varying the limit amount in accordance with the total of the normalized toner amounts rather than always implementing limitation by means of a fixed amount, the generation of blurring is suppressed and color reproducibility in dark areas can be improved without producing brightness inversion.

This will now be explained by means of a specific example. In a case where the three RGB shown in FIGS. 4A, 4B, 4C are inputted, each of the values of c, m, and y in FIG. 4A are 240, 224, and 255 respectively, which are 240, 224, and 255 when normalized. The total of the normalized toner amounts in this case is then (240+224+255)/255×100=281 (%), which exceeds 250%. Accordingly, the largest limit amount then becomes β+γ (190% supposing that β is 160% and γ is 30%). Further, in the case of FIG. 4B, the total of the normalized toner amounts becomes (255+238+102)/255×100=233(%), which is between 200% and 250%. Hence, the largest limit amount becomes β+θ=β+((c"+m"+y")/255−2)×2×γ (180% supposing that β is 160%). In addition, in the case of FIG. 4C, because the total of the normalized toner amounts is 150% and no more than 200%, the largest limit amount is then β (likewise 160%).

Returning now to FIG. 2, undercolor removal and black generation processing are then performed (step S15). This process reduces the amount of data by substituting common components among the CMY components with a black component as mentioned earlier and then determines the proportion of the black component. More specifically, the following arithmetic expressions are employed:

$k'=\min(c', m', y')$ $C=c-UCR(k')$ $M=m-UCR(k')$ $Y=y-UCR(k')$ $K=BG(k')$.

The color with the smallest value among c', m', and y' calculated in step S12 is taken as k', respective values being found by means of function UCR with k' serving as the parameter. The respective values of C, M, and Y are found by subtracting these values from c, m, and y calculated in step S11. Further, K, which is the black component, is found by substitution in function BG with k' similarly serving as the parameter.

Figure 8:
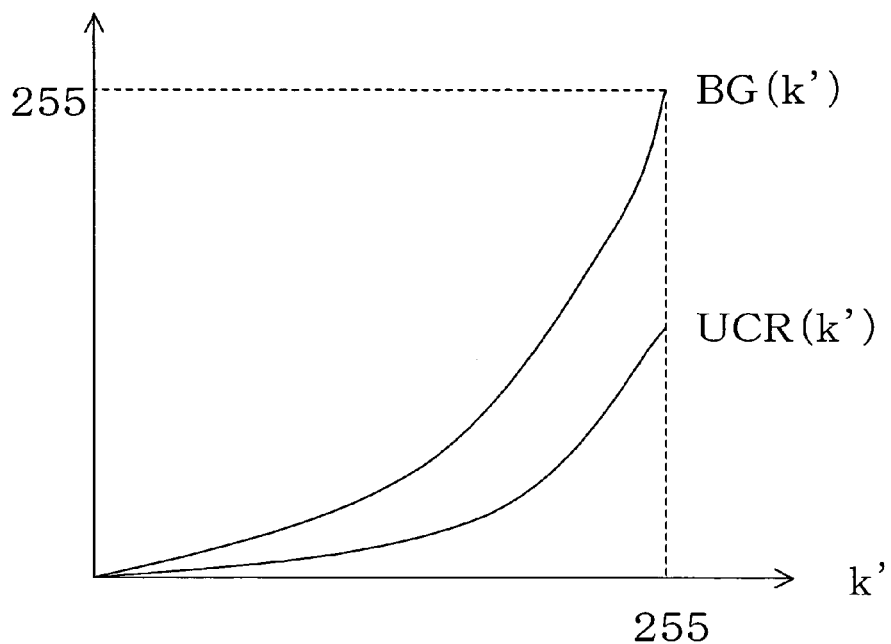
FIG. 8 shows an example of the function used in undercolor removal and black generation.

An example of the relationship between the functions UCR and BG is shown in FIG. 8. The horizontal axis represents k', and the vertical axis represents the output value. The value of k' in both functions UCR and BG is not set so that the value of k' is outputted unchanged but instead so that the output value is reduced. This is so that the overall total toner amount is kept at approximately 230% by means of undercolor removal, black generation, and the like, and the generation of blurring is prevented, whereby image quality is improved.

More particularly, the output value of the function UCR must also be kept low by outputting k' as is because some CMY must also remain so that image degradation does not occur as a result of the loss in the body of the image and the like in the shadow areas when the CMY common components are all substituted with the black component. Computation may be performed by storing such a function on a storage medium such as a ROM (not illustrated) and then suitably reading out this function, or the output value maybe obtained by using a table that is pre-stored on the storage medium.

Returning now to FIG. 2, the CMYK total outputted as a result of undercolor removal and so forth and the largest limit amount (Total Limit) calculated in step S14 are then compared (step S16). That is, the Duty limit is applied so that the respective CMYK values are equal to or less than the largest limit amount. More specifically, a value rendered by finding the sum total of the respective CMYK values calculated in step S15, dividing this value by 255 and multiplying same by 100 is compared with the largest limit value.

When this value is higher than the largest limit amount, processing moves to step S17 and the Duty limit is applied. More specifically, the limit amount UCR_rate is first found by means of the following arithmetic expression.

$$UCR\_rate = (TotalLimit/100 - K/255)/\{(C+M+Y)/255\}.$$

$$= (TotalLimit/100 - K/255) \times /(C+M+Y).$$

Next, the output values C', M', and Y' are found by multiplying each of the values of CMY by the UCR_rate thus found. That is, $C'=C \times UCR\_rate$ $M'=M \times UCR\_rate$ $Y'=Y \times UCR\_rate$ Here, K', which is the output value of K, is such that K found in step S15 is outputted unchanged without being limited.

That is,

K'=K. By performing computation as detailed above, an output is made without the total of the output values C', M', Y', and K' exceeding the largest limit amount. Further, the ratio of C,M,Y is maintained even for the reduced C', M', Y'. That is, when the total of the normalized toner amounts of c",m",y" is less than 200% (first threshold value), the total of the total toner amount of C', M', Y', K' is equal to or less than β (160% in the example in FIG. 7), which is the largest limit amount (Total Limit); when the total of the normalized toner amounts of c",m",y" lies between 200% and 250%, the total toner amount of C', M', Y', K' is equal to or less than β+θ; and, when the total of the normalized toner amounts of c",m',y" exceeds 250%, the total toner amount of C', M', Y', K' is then equal to or less than β+γ(190% in the example in FIG. 7).

On the other hand, when step S16 yields NO, the total toner amount, which is the total of the respective CMYK values, is then equal to or less than the largest limit amount and is therefore outputted as is without a Duty limit being applied. That is, as follows:

C'=C, M'=M, Y'=Y, K'=K.

Further, color conversion processing is then complete (step S18). Thereafter, C', M', Y', and K', which are the output values, are outputted to the screen processing unit 21, and then the above processing is performed, thus enabling a print output to be obtained.

Figure 9:
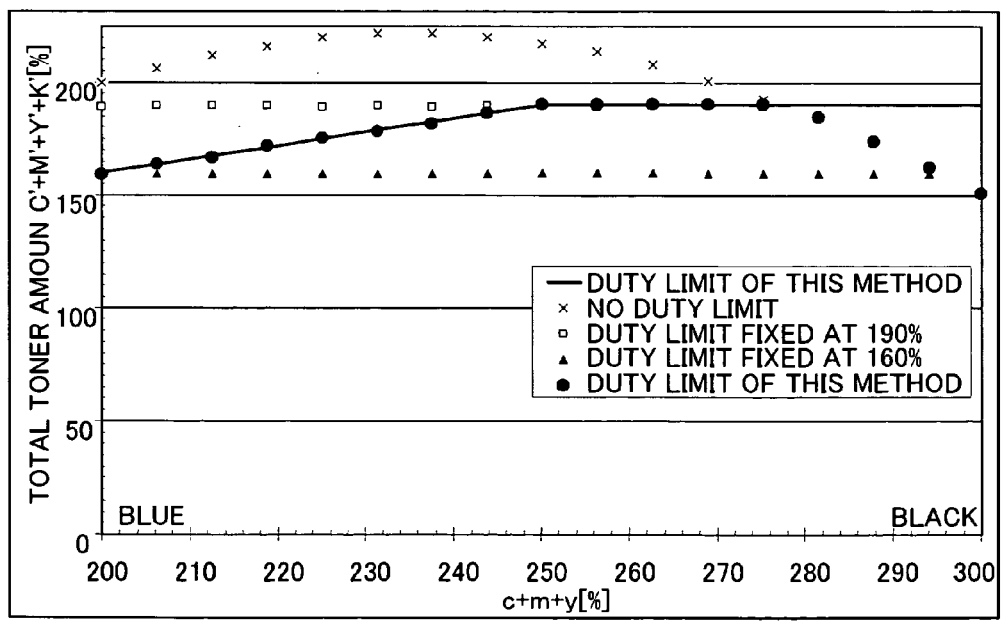
FIG. 9 shows the relationship between the normalized toner amount and the total toner amount.

The relationship between the total toner amount and normalized toner amounts according to the present invention is shown in FIG. 9. The horizontal and vertical axes are the same as in FIG. 6. Further, the toner amount of the present invention is plotted by means of black circle symbols and the limit amount is indicated by a solid line. Otherwise, FIG. 9 is the same as FIG. 6. Although, when there is absolutely no Duty limit, the toner amount increases to close to 230% as the normalized toner amounts increase, the total toner amount also accordingly increases in the case of the present invention.

Figure 10:
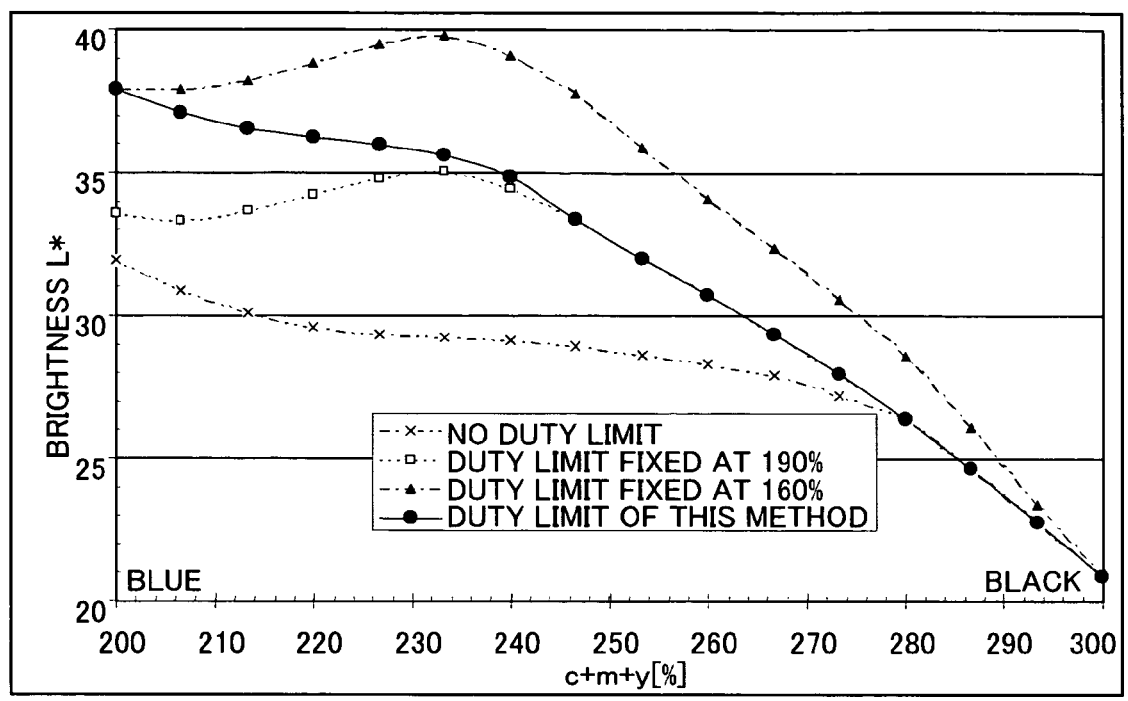
FIG. 10 shows the relationship between the normalized toner amount and brightness.

FIG. 10 shows the relationship between the normalized toner amount and brightness. The vertical and horizontal axes are the same as those in FIG. 5, and the brightness of the present invention is indicated by a solid line plotted by means of black circle symbols. Otherwise, FIG. 10 is the same as FIG. 5. As shown in FIG. 10, according to the present invention, brightness inversion is not generated in comparison with a case where Duty limitation, although present, is always implemented with a fixed limit amount. The brightness gradually decreases as black is approached, and the color reproducibility in dark areas is improved.

Further, the above arithmetic expression is stored on a storage medium such as a ROM (not shown), for example, so that processing is performed by reading out the arithmetic expression from the ROM when processing is performed by the color conversion unit 210 of the color processing unit 20, the UCR+BG unit 211, and the limit processing unit 212. Further, units 210, 211, and 212 may each comprise a ROM or other storage medium where each of the above arithmetic expressions may be stored.

As already described above, the present invention applies a Duty limit to the respective values of the output CMYK so that these values are equal to or less than a limit amount in order to suppress the generation of blurring. However, because brightness inversion is generated when the limit amount is always fixed, Duty limitation is implemented with the limit amount made variable. Therefore, color reproducibility is raised in dark areas without this phenomenon occurring, whereby a high-quality image output can be obtained.

Although the above example was described by taking the example of a laser printer, an inkjet printer or other print output apparatus may also be used. In addition, the processing of the present invention may be performed by means of an information terminal such as a personal computer, cellular telephone, or digital camera on which the processing of the present invention has been mounted and installed, and then transferred to a print output apparatus to obtain an image output. Furthermore, the color processing unit was described in terms of the color conversion unit 210, UCR+BG unit 211, and the limit processing unit 212. However, the respective outputs C', M', Y', K', which are produced by subjecting inputs RGB to Duty limitation in accordance with the largest limit amount by using a lookup table, may be obtained.

Further, an example for the Duty limit amount that is divided into three stages, which are a fixed value $\beta$, $\beta+\theta$, which produces a gradual increase, and then a fixed value $\beta+\gamma$, as shown in FIG. 7, has been described. However, the limit amount may also be varied in accordance with the total of the normalized toner amounts of cyan, magenta, and yellow, and varied further in four and five stages. Further, the shape of the graph may not increase from a fixed value as shown in FIG. 7, and there may be a gradual decrease in a certain region.

Furthermore, although the largest limit amount is determined by means of the sum total of the normalized toner amounts of each of the colors cyan, magenta, and yellow, the largest limit amount can also be determined from the sum total of the toner amounts.

What is claimed is:

1. An image forming apparatus, comprising:
   color processing unit that determines amounts of recording agent so that, when total of primary color grayscale values generated from input image data is equal to or less than a first threshold value, total of the amounts of recording agent of a plurality of colors is equal to or less than a first total limit, and determine the amounts of recording agent so that, when the total of the primary color grayscale values is equal to or more than a second threshold value larger than the first threshold value, the total of the amounts of the recording agent is equal to or less than a second total limit larger than the first total limit; and
   recording unit which records an image for the input image data on a recording medium on the basis of the amounts of recording agent of the plurality of colors determined by the color processing unit.

2. The image forming apparatus according to claim 1, wherein the color processing unit determines the amounts of recording agent so that, when the total of the primary color grayscale values is between the first and second threshold values, the total of the amounts of the recording agent is equal to or less than a third total limit between the first and second total limits.

3. The image forming apparatus according to claim 2, wherein, when the total of the amounts of recording agent exceeds the first total limit or the second total limit, the color processing unit reduces the total of the amounts of recording agent within a third total limit so that the proportions of the amounts of recording agent of each color do not change.

4. The image forming apparatus according to claim 1, wherein the total of primary color grayscale values is determined by total of the values rendered by normalizing the primary color grayscale values.

5. The image forming apparatus according to claim 4, wherein the total of the normalized values is a total of values rendering by normalizing complementary color grayscale value of the input image data in a primary color of a printer.

6. The image forming apparatus according to claim 1, wherein the color processing unit further comprise:
   undercolor removal unit which determines the amounts of recording agent of the plurality of colors by performing undercolor removal and black generation processing on the generated primary colors.

7. The image forming apparatus according to claim 1, wherein the primary colors are cyan, magenta, and yellow, and the plurality of colors has black added thereto.

8. An image processing method for generating data, from input image data, to drive a print engine which prints an image on a recording medium, the method comprising the steps of:
   determining amounts of recording agent so that, when total of primary color grayscale values generated from the input image data is equal to or less than a first threshold value, total of the amounts of recording agent of a plurality of colors is equal to or less than a first total limit; and
   determining the amounts of recording agent so that, when the total of the primary color grayscale values is equal to or more than a second threshold value larger than the first threshold value, the total of the amounts of the recording agent is equal to or less than a second total limit larger than the first total limit.

9. A computer-readable medium storing a program, which is executed in a computer, for determining the amounts of recording agent, the program comprising:
  determining amounts of recording agent so that, when total of primary color grayscale values generated from input image data is equal to or less than a first threshold value, total of the amounts of recording agent of a plurality of colors is equal to or less than a first total limit; and
  determining the amounts of recording agent so that, when the total of the primary color grayscale values is equal to or more than a second threshold value larger than the first threshold value, the total of the amounts of the recording agent is equal to or less than a second total limit larger than the first total limit.

10. An image processing apparatus, which determines amounts of recording agent of a plurality of colors for a recording unit, comprising:
  color processing unit that determines amounts of recording agent so that, when total of primary color grayscale values generated from input image data is equal to or less than a first threshold value, total of the amounts of recording agent of a plurality of colors is equal to or less than a first total limit, and determine the amounts of recording agent so that, when the total of the primary color grayscale values is equal to or more than a second threshold value larger than the first threshold value, the total of the amounts of the recording agent is equal to or less than a second total limit larger than the first total limit.

* * * * *